(12) United States Patent
SungTae

(10) Patent No.: US 11,151,861 B2
(45) Date of Patent: Oct. 19, 2021

(54) VEHICLE WITH REAR OCCUPANT ALERT FUNCTION AND METHOD OF CONTROLLING THE SAME

(71) Applicants: Hyundai Motor Company, Seoul (KR); Kia Motors Corporation, Seoul (KR)

(72) Inventor: Choi SungTae, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/065,099

(22) Filed: Oct. 7, 2020

(65) Prior Publication Data
US 2021/0280042 A1 Sep. 9, 2021

(30) Foreign Application Priority Data
Mar. 4, 2020 (KR) .................. 10-2020-0027265

(51) Int. Cl.
| | |
|---|---|
| *B60R 25/10* | (2013.01) |
| *G08B 21/24* | (2006.01) |
| *G08B 21/02* | (2006.01) |
| *B60R 25/34* | (2013.01) |
| *B60R 25/31* | (2013.01) |
| *B60R 25/102* | (2013.01) |

(52) U.S. Cl.
CPC .......... *G08B 21/24* (2013.01); *B60R 25/102* (2013.01); *B60R 25/1009* (2013.01); *B60R 25/31* (2013.01); *B60R 25/34* (2013.01); *G08B 21/0225* (2013.01); *G08B 21/0247* (2013.01)

(58) Field of Classification Search
CPC ............... G08B 21/24; G08B 21/0225; G08B 21/0247; B60R 25/1009; B60R 25/102; B60R 25/31; B60R 25/34
See application file for complete search history.

(56) References Cited

U.S. PATENT DOCUMENTS

| | | | | |
|---|---|---|---|---|
| 4,929,925 A | * | 5/1990 | Bodine | B60R 25/1009 180/167 |
| 5,867,091 A | * | 2/1999 | Chard | G08B 29/24 340/426.26 |
| 7,626,492 B2 | * | 12/2009 | Sugiura | G01J 5/34 250/203.4 |
| 9,845,050 B1 | * | 12/2017 | Garza | B60Q 9/00 |
| 2003/0030548 A1 | * | 2/2003 | Kovacs | B60R 25/102 340/426.1 |
| 2019/0019392 A1 | * | 1/2019 | Lu | B60Q 1/52 |
| 2019/0054841 A1 | * | 2/2019 | Cech | G08B 21/22 |
| 2021/0008959 A1 | * | 1/2021 | Lee | B60H 1/00978 |

* cited by examiner

*Primary Examiner* — Nay Tun
(74) *Attorney, Agent, or Firm* — Mintz Levin Cohn Ferris Glovsky and Popeo, P.C.; Peter F. Corless

(57) ABSTRACT

A vehicle includes a first detector configured to transmit and receive an ultrasonic signal to detect a presence or absence of an occupant inside the vehicle based on the ultrasonic signal; a second detector configured to detect an opening and closing state of a window including at least one of an upper window or a side window provided in the vehicle; and a controller configured to compare an intensity of the ultrasonic signal received by the first detector and a preset level to determine the presence of the occupant. The controller may be configured to change the preset level based on the opening and closing state detected by the second detector.

19 Claims, 8 Drawing Sheets

FIG. 4

| OPENING AND CLOSING STATE OF UPPER WINDOW / OPENING AND CLOSING STATE OF SIDE WINDOW | FIRST STATE | SECOND STATE | THIRD STATE |
|---|---|---|---|
| FIRST STATE | LEVEL 1-1 | LEVEL 2-1 | LEVEL 3-1 |
| SECOND STATE | LEVEL 1-2 | LEVEL 2-2 | LEVEL 3-2 |
| THIRD STATE | LEVEL 1-3 | LEVEL 2-3 | LEVEL 3-3 |

VEHICLE WITH REAR OCCUPANT ALERT FUNCTION AND METHOD OF CONTROLLING THE SAME

CROSS-REFERENCE TO RELATED APPLICATION(S)

This application claims under 35 U.S.C. § 119 the benefit of Korean Patent Application No. 10-2020-0027265, filed on Mar. 4, 2020 in the Korean Intellectual Property Office, the entire contents of which are incorporated by reference herein.

BACKGROUND

(a) Technical Field

The disclosure relates to a vehicle with a rear occupant alert (ROA) function and a method of controlling the same.

(b) Description of the Related Art

Recently, certain new vehicles have been equipped with a rear occupant alert (ROA) function to prevent a driver from leaving a child in a rear seat.

The ROA is a technology that detects whether a child is in a vehicle when a driver gets up to depart from the vehicle and sends an alarm sound or message to prevent the driver from inadvertently departing without the child, in order to ensure safety of the child.

To carry out the ROA function, various sensors may be provided in the vehicle, and ultrasonic sensors are typically employed. However, ultrasonic signals may be influenced by external factors, and when a window or sunroof of the vehicle is opened, there is a possibility that an alarm may occur due to wind, presence of insects, etc., even though the rear seat remains unoccupied.

SUMMARY

The present disclosure provides a vehicle capable of preventing malfunction of a rear occupant alert (ROA) function, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle includes a first detector configured to transmit and receive an ultrasonic signal to detect a presence or absence of an occupant inside the vehicle based on the ultrasonic signal; a second detector configured to detect an opening and closing state of a window including at least one of an upper window or a side window provided in the vehicle; and a controller configured to compare an intensity of the ultrasonic signal received by the first detector and a preset level to determine the presence of the occupant. The controller may be configured to change the preset level based on the opening and closing state detected by the second detector.

The second detector may be configured to detect the opening and closing state of the upper window or the side window. The opening and closing state may include a first state in which both the upper window and the side window are not open, a second state in which the upper window or the side window is partially open, and a third state in which the upper window or the side window is fully open. The controller may be configured to determine the presence of the occupant based on the second level in the second state, to determine the presence of the occupant based on the first level lower than the second level in the first state, and to determine the presence of the occupant based on the third level higher than the second level.

The vehicle may further include a storage in which a level table to which the preset level is assigned for each the opening and closing state is stored. The controller may be configured to determine the presence of the occupant based on the preset level corresponding to the opening and closing state based on the level table.

The controller may be configured to measure the intensity of the ultrasonic signal a plurality of times.

When the intensity of the ultrasonic signal higher than the preset level among the plurality of times is continuously measured, the controller may be configured to determine that the occupant is present in the vehicle.

The vehicle may further include a communicator configured to communicate with a user terminal. When it is determined that there is the occupant in the vehicle, the controller may be configured to control the communicator to transmit a warning signal to the user terminal.

When the intensity of the ultrasonic signal is higher than the changed preset level, the controller may be configured to determine that the occupant is present in the vehicle.

When the intensity of the ultrasonic signal is lower than the changed preset level, the controller may be configured to determine that there is no the occupant in the vehicle.

When starting of the vehicle is detected to be off, the controller may be configured to control the second detector to detect the opening and closing state of the window.

In accordance with another aspect of the disclosure, a method of controlling a vehicle includes transmitting and receiving an ultrasonic signal to detect a presence or absence of an occupant inside the vehicle based on the ultrasonic signal; detecting an opening and closing state of a window including at least one of an upper window or a side window provided in the vehicle; and changing a preset level based on the opening and closing state, and comparing an intensity of the ultrasonic signal with the changed preset level to determine the presence of the occupant.

The detecting of the opening and closing state of the window may include detecting the opening and closing state of the upper window or the side window. The opening and closing state may include a first state in which both are not open, a second state in which the upper window or the side window is partially open, and a third state in which the upper window or the side window is fully open. The determining of the presence of the occupant may include determining the presence of the occupant based on the second level in the second state, determining the presence of the occupant based on the first level lower than the second level in the first state, and determining the presence of the occupant based on the third level higher than the second level.

The determining of the presence of the occupant may include determining the presence of the occupant based on the preset level corresponding to the opening and closing state based on a level table to which the preset level is assigned for each the opening and closing state.

The determining of the presence of the occupant may include measuring the intensity of the ultrasonic signal a plurality of times.

The determining of the presence of the occupant may include when the intensity of the ultrasonic signal higher than the preset level among the plurality of times is continuously measured, determining that the occupant is present in the vehicle.

The method may further include: when it is determined that there is the occupant in the vehicle, controlling to transmit a warning signal to the user terminal.

The determining of the presence of the occupant may include when the intensity of the ultrasonic signal is higher than the changed preset level, determining that the occupant is present in the vehicle.

The determining of the presence of the occupant may include when the intensity of the ultrasonic signal is lower than the changed preset level, determining that there is no the occupant in the vehicle.

The detecting of the opening and closing state of the window may include when starting of the vehicle is detected to be off, controlling to detect the opening and closing state of the window.

In accordance with another aspect of the disclosure, a non-transitory computer readable medium containing program instructions executed by a processor includes program instructions that transmit and receive an ultrasonic signal to detect a presence or absence of an occupant inside the vehicle based on the ultrasonic signal; program instructions that detect an opening and closing state of a window including at least one of an upper window or a side window provided in the vehicle; and program instructions that change a preset level based on the opening and closing state, and comparing an intensity of the ultrasonic signal with the changed preset level to determine the presence of the occupant.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 4 and 5 are views illustrating a table assigned with a level corresponding to an opening and closing state of a window.

DETAILED DESCRIPTION

Figure 1:
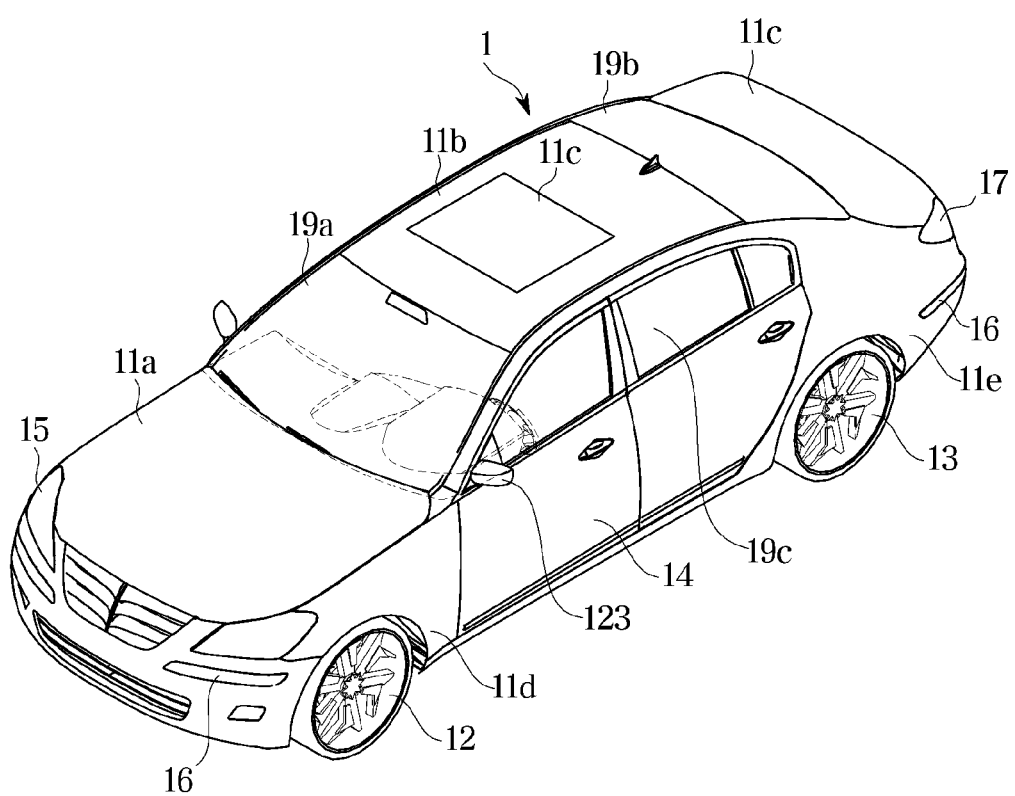
FIG. 1 is a view illustrating a configuration of a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like reference numerals refer to like elements throughout the specification. Not all elements of the embodiments of the disclosure will be described, and the description of what are commonly known in the art or what overlap each other in the embodiments will be omitted. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Hereinafter, an operation principle and embodiments of the disclosure will be described with reference to accompanying drawings.

Figure 2:
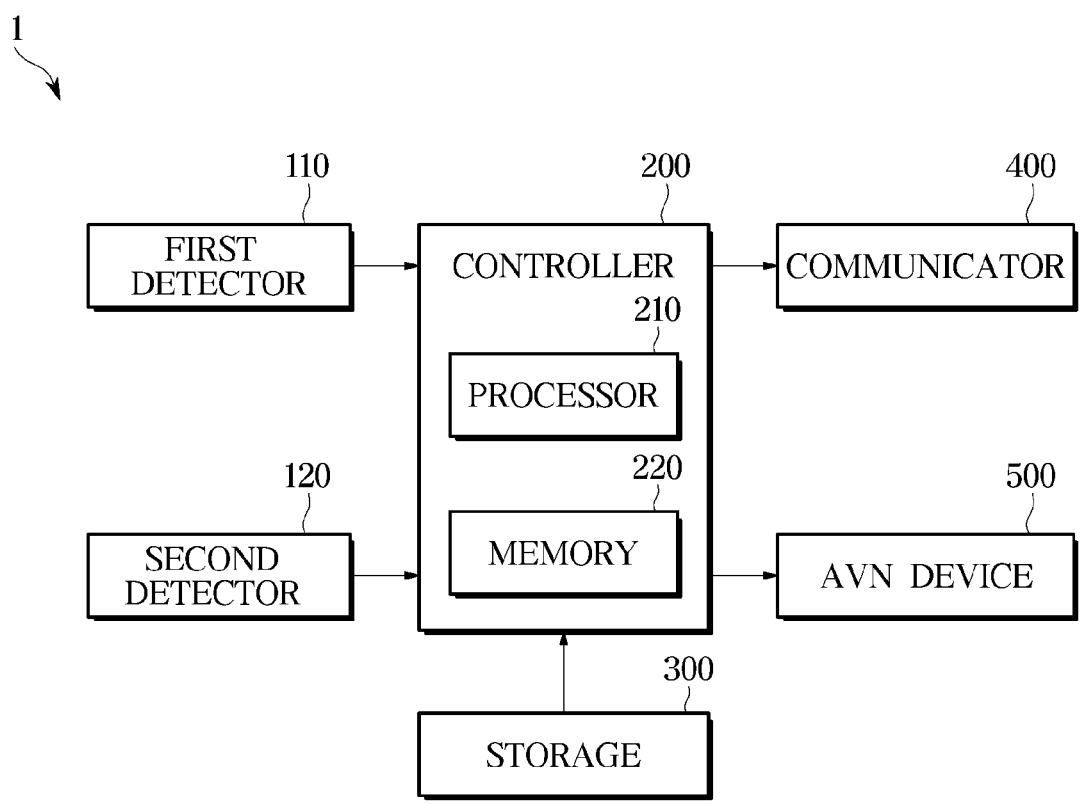
FIG. 2 is a control block diagram of a vehicle according to an embodiment.

FIG. 1 is a view illustrating a configuration of a vehicle according to an embodiment, and FIG. 2 is a control block diagram of a vehicle according to an embodiment.

As illustrated in FIG. 1, a vehicle 1 may include a body that forms an exterior of the vehicle 1 and wheels 12 and 13 that move the vehicle 1.

The body may include a hood 11*a* for protecting various devices necessary for driving the vehicle 1, such as an engine, a roof panel 11*b* forming an indoor space, a trunk lid 11*c* provided with a storage space, and a front fender 11*d* and a quarter panel 11*e* provided on a side surface of the vehicle 1. In addition, a plurality of doors 14 hinged to the body may be provided on the side surface of the body.

A front window 19*a* may be provided between the hood 11*a* and the roof panel 11*b* to provide a field of view in front of the vehicle 1, and a rear window 19*b* may be provided between the roof panel 11*b* and the trunk lid 11*c* to provide a rear view.

A side window 19*c* may be provided on an upper side of the door 14 to provide a side view. In addition, an upper window 11*c* may be provided in one area of the roof panel 11*b* to provide an upper field of view. The upper window 11*c* may be a sunroof of a tilt-up method, a slide method, a panoramic method, or a canvas top method, which may be opened by manipulation of an occupant.

Meanwhile, the disclosure relates to a rear occupant alert (ROA) based on an opening and closing state of a window including at least one the side window 19c or the upper window 11c. The ROA is a technology that notifies a driver in case an infant or companion animal is left unattended in a rear seat when the driver gets up to depart from the vehicle.

For example, the ROA may detect the presence of the occupant through various sensors provided in the vehicle 1 before the driver gets up, and provide a warning signal through a cluster or an AVN device 500. In addition, the ROA may detect the presence of the occupant through various sensors provided in the vehicle 1 after the driver gets up, and provide a warning signal through a user terminal such as a smart phone. At this time, the various sensors may be a weight sensor mounted inside the seat of a vehicle seat, or may be an ultrasonic sensor installed on one side wall inside the vehicle 1 to transmit and receive ultrasonic signals.

At a front of the vehicle 1, a headlamp 15 for irradiating lighting in a traveling direction of the vehicle 1 may be provided.

A turn signal lamp 16 may be provided at the front and rear of the vehicle 1 to indicate the traveling direction of the vehicle 1.

A tail lamp 17 may be provided at a rear of the vehicle 1. The tail lamp 17 may be provided at the rear of the vehicle 1 to display a gear shift state, a brake operation state, and the like of the vehicle 1.

Each configuration of a control block diagram of the vehicle 1 will be described with reference to FIG. 2.

The vehicle 1 according to an embodiment may include a first detector 11 for transmitting and receiving the ultrasonic signals to detect a presence or absence of the occupant therein, and a second detector 120 that detects the opening and closing state of the window including at least one of the side window 19c or the upper window 11c provided in vehicle 1.

A controller 200 may compare an intensity of the ultrasonic signal received by the first detector 110 with a preset level to determine whether the occupant is present in the rear seat. For example, when the intensity of the ultrasonic signal received by the first detector 110 is higher than the preset level, the controller 200 may determine that the occupant is present in the rear seat. When the intensity of the ultrasonic signal received by the first detector 110 is lower than the preset level, the controller 200 may determine that the occupant does not present in the rear seat.

When the window of the vehicle 1 is opened, the ROA may cause a detection error due to factors of an external environment. For example, the first detector 110 may detect the ultrasonic signal stronger than usual even when there is no occupant in the rear seat by a variable such as wind or insects from the outside when the window is opened.

In order to solve this problem, the disclosure may change a condition for determining the presence or absence of the occupant in consideration of the opening and closing state of the window. A detailed control process will be described later.

The first detector 110 may be the ultrasonic sensor installed on one side wall of the vehicle 1 to transmit and receive the ultrasonic signals. In addition, the first detector 110 may include, in addition to the ultrasonic sensor, a weight detection sensor embedded in the seat of the vehicle 1, and an infrared sensor installed on one side wall of the vehicle 1 to transmit and receive infrared signals.

The second detector 120 may detect the opening and closing state of the window including at least one of the side window 19c or the upper window 11c provided in the vehicle 1. For example, the second detector 120 may be an optical sensor, a rotation sensor, or a limit sensor, and detect a state in which the window is not open at all, a state in which a part of the window is opened, and a state in which the windows are all opened.

The controller 200 may determine the presence of the occupant based on the intensity of the ultrasonic signal detected by the first detector 110. Particularly, the controller 200 may determine the presence of the occupant based on comparing the intensity of the ultrasonic signal with the preset level. In addition, the controller 200 may change the preset level based on the opening and closing state of the window received from the second detector 120, and determine the presence of the occupant based on comparing the intensity of the ultrasonic signal with the changed preset level. An example of the changed level will be described with reference to FIG. 3.

Figure 3:
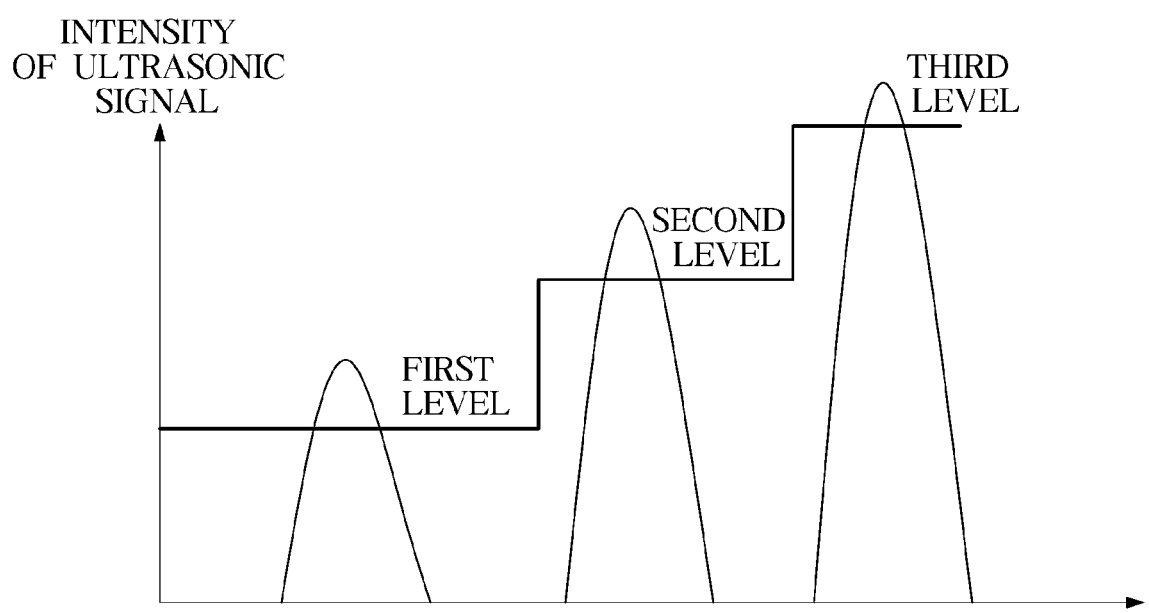
FIG. 3 is a view illustrating a level according to an opening and closing state of a window.

Referring to FIG. 3, the intensity of the ultrasonic signal may be compared with a first level, a second level, or a third level. The controller 200 may compare the intensity of the ultrasound signal with the first level, the second level, or the third level according to the opening and closing state of the window.

For example, the first level is a case in which the window does not open at all and there is no need to change the preset level. The interior of the vehicle 1 is a state in which the window is not opened at all, so it is not affected by the outside. Accordingly, the controller 200 may determine the presence of the occupant based on the first level, which is an existing preset level.

As another example, the second level is a case in which the part of the window is opened. The interior of the vehicle 1 may be affected by insects or wind introduced from the outside by opening the window. Accordingly, the controller 200 may determine the presence of the occupant based on the second level, which is a reference raised from the first level.

As another example, the third level is a case in which all of the windows are opened. The interior of the vehicle 1 may be influenced more by the outside than when the window is partially opened. Accordingly, the controller 200 may determine the presence of the occupant based on the third level, which is the reference that is raised from the second level.

However, FIG. 3 illustrates the intensity and comparison of the ultrasonic signal based on the three levels, but may be based on various levels based on various combinations between the opening and closing state of the upper window 11c and the opening and closing state of the side window 19c. Descriptions related to this will be described later.

The controller 200 may include at least one memory 220 in which programs for performing the above-described operations and operations described below are stored, and at least one processor 210 for executing the stored programs. When the memory 220 and the processor 210 are provided in plural, it is possible that the memory 220 and the processor 210 are integrated in one chip, and it is also possible to be provided in a physically separate position.

The storage 300 may store a level table in which the plurality of levels corresponding to various opening and closing state of the windows are stored. As described above, the window may include the side window 19c and the upper window 11c. The side window 19c and the upper window 11c may display various opening and closing states by the driver or the occupant.

Figure 5:
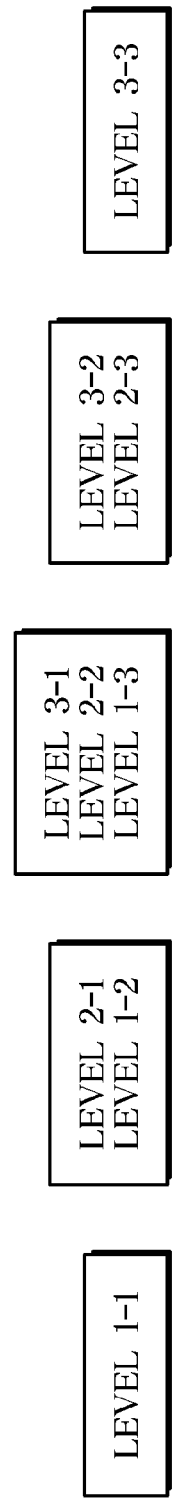

FIGS. 4 and 5 are views illustrating a table assigned with a level corresponding to an opening and closing state of a window.

Referring to FIG. 4, the level corresponding to the combination of the opening and closing states of the side window 19c and the upper window 11c may be confirmed. For example, when the side window 19c and the upper window 11c are in the first state at the same time, it may refer to that both the side window 19c and the upper window 11c are closed. In this case, it is expected that there will be no external influence, and the occupant may be determined based on a lowest level 1-1.

Conversely, when the side window 19c and the upper window 11c are in the third state at the same time, it may refer to that the side window 19c and the upper window 11c are both fully opened. In this case, the external influence is expected to be the greatest. Therefore, it is possible to determine the presence of the occupant based on a highest level 3-3. Referring to FIG. 5, it is possible to identify a relative size of the level from the 1st to 3rd level. The relative size of the level according to FIG. 5 is only an example, and of course, it may be determined by a manufacturer's setting or a user's setting. For example, the relative size of the level according to FIG. 5 may be set to various levels according to the total amount of opening of the side window 19c and the upper window 11c, in addition to the five levels illustrated.

As illustrated in FIG. 4, the opening and closing states of the side window 19c and the upper window 11c may be configured in nine combinations. However, the level table illustrated in FIG. 4 is only an example, and may include an additional combination in consideration of the degree of opening of the window and the external wind state.

The vehicle 1 according to an embodiment may further include a communicator 400 and an AVN device 500.

The communicator 400 may communicate with the user terminal, and when the controller 200 determines that there are the occupant in the rear seats, the communicator 400 may transmit the warning signal to the user terminal indicating that the occupant is present in the vehicle 1. For example, the communicator 400 may cause the warning signal to be output through a text message or a push message provided by an application mounted on the user terminal.

When the controller 200 determines that there is the occupant in the rear seat, the AVN device 500 may output the warning signal through a display or audio before the driver gets up to depart from the vehicle.

The configuration of the vehicle 1 according to an embodiment and the operation of each configuration have been described in detail. Hereinafter, a method of controlling implemented by the above-described configuration will be described in detail for each step with reference to FIGS. 6 to 8.

Figure 6:
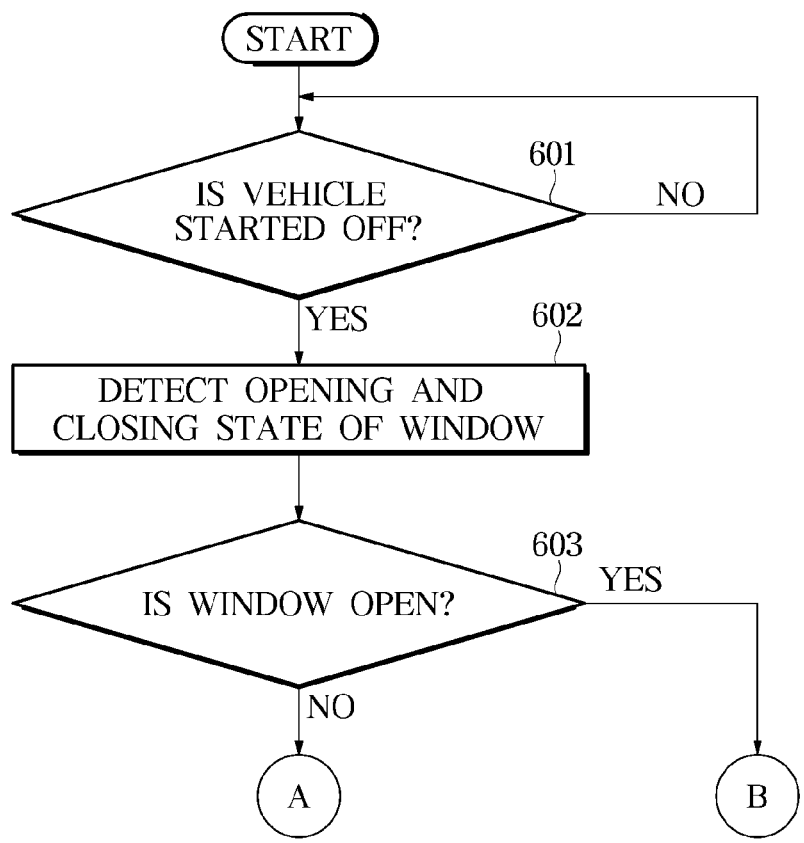
FIGS. 6 to 8 are flowcharts of a method of controlling a vehicle according to an embodiment.
Figure 7:
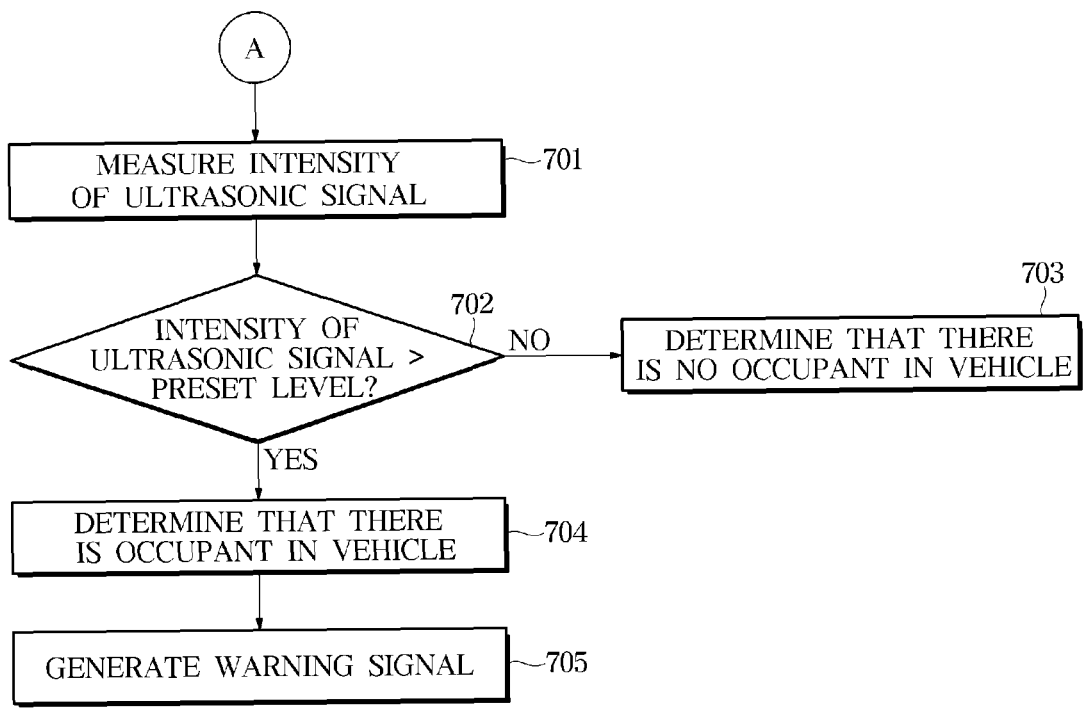
Figure 8:
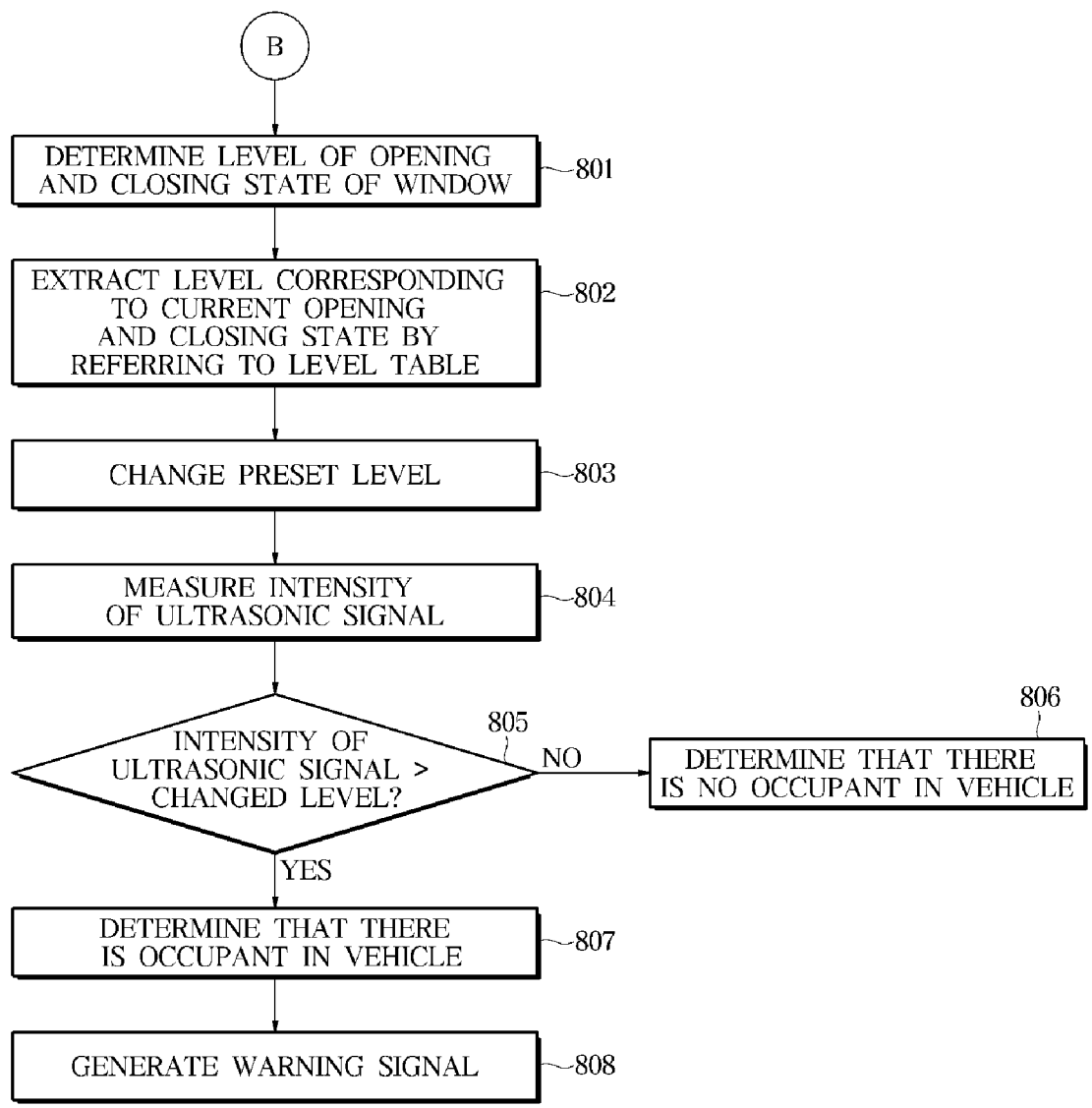

FIGS. 6 to 8 are flowcharts of a method of controlling a vehicle according to an embodiment.

Referring to FIG. 6, the controller 200 may determine whether the vehicle 1 is turned off (i.e., not started) (601). The disclosure is to notify when the driver does not recognize the occupant remaining in the rear seat after the driver gets up to depart from the vehicle, and detects an off state of the starting of the vehicle 1 in advance.

The controller 200 may detect the opening and closing state of the window through the second detector 120 (602), and according to the opening state of the window (603), may change the preset level. The opening state of the window may be largely divided into a state that is not open at all (A) and a state that is somewhat open (B). Each case will be described in detail with reference to FIGS. 7 and 8.

FIG. 7 illustrates a process of determining the presence of the occupant in the state in which the window is not opened at all.

The controller 200 may measure the intensity of the ultrasonic signal (701) and compare the intensity of the ultrasonic signal with the preset level (702).

As a result of comparison, when the intensity of the measured ultrasonic signal is lower than the preset level, the controller 200 may determine that there is no the occupant in the vehicle 1 (703).

Conversely, when the intensity of the measured ultrasonic signal is higher than the preset level, the controller 200 may determine that there is the occupant in the vehicle 1 (704), and generate the warning signal (705).

Although not illustrated in FIG. 7, the first detector 110 may transmit and receive the intensity of the ultrasonic signal a plurality of times. At this time, the controller 110 may determine that the occupant is present in the vehicle 1 when the intensity of the ultrasonic signal higher than the preset level among the plurality of times is continuously measured. By comparing the intensity of the ultrasonic signal the plurality of times, it is possible to increase the reliability of rear occupant detection.

FIG. 8 illustrates an algorithm, unlike FIG. 7, with the window at least partially open.

As illustrated in FIG. 8, when detecting that the window is in the opening state, the controller 200 may determine the level of the opening and closing state of the window (801). The opening and closing state of the window may represent various combinations, as described with reference to FIG. 4.

The controller 200 may extract the level corresponding to the current opening and closing state by referring to the stored level table (802), change the preset level to the level suitable for the opening and closing state of the current window (803), and measure the intensity of the ultrasonic signal received by the first detector 110 (804).

The controller 200 may compare the intensity of the ultrasonic signal and the changed level (805).

As a result of comparison, when the intensity of the measured ultrasonic signal is lower than the changed level, the controller 200 may determine that there is no the occupant in the vehicle 1 (806).

Conversely, when the intensity of the measured ultrasonic signal is higher than the changed level, the controller 200 may determine that there is the occupant in the vehicle 1 (807), and generate the warning signal (808).

Although not illustrated in FIG. 8, the first detector 110 may transmit and receive the intensity of the ultrasonic signal multiple times. At this time, the controller 110 may determine that the occupant is present in the vehicle 1 when the intensity of the ultrasonic signal higher than the changed level among the plurality of times is continuously measured. By comparing the intensity of the ultrasonic signal the plurality of times, it is possible to increase the reliability of rear occupant detection.

According to an aspect of the disclosure, the disclosure may prevent a malfunction of the ROA.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
   a first detector configured to transmit and receive an ultrasonic signal to detect a presence or absence of an occupant inside the vehicle based on the ultrasonic signal;
   a second detector configured to detect an opening and closing state of a window including at least one of an upper window or a side window provided in the vehicle; and
   a controller configured to compare an intensity of the ultrasonic signal received by the first detector and a preset level to determine the presence of the occupant,
   wherein the controller is configured to change the preset level based on the opening and closing state detected by the second detector.

2. The vehicle according to claim 1, wherein:
   the second detector is configured to detect the opening and closing state of the upper window or the side window;
   the opening and closing state comprises a first state in which both the upper window and the side window are not open, a second state in which the upper window or the side window is partially open, and a third state in which the upper window or the side window is fully open; and
   the controller is configured to determine the presence of the occupant based on a second level in the second state, to determine the presence of the occupant based on a first level lower than the second level in the first state, and to determine the presence of the occupant based on a third level higher than the second level.

3. The vehicle according to claim 1, further comprising:
   a storage in which a level table to which the preset level is assigned for each of the opening and closing state is stored,
   wherein the controller is configured to determine the presence of the occupant based on the preset level corresponding to the opening and closing state based on the level table.

4. The vehicle according to claim 1, wherein the controller is configured to measure the intensity of the ultrasonic signal a plurality of times.

5. The vehicle according to claim 4, wherein when the intensity of the ultrasonic signal higher than the preset level among the plurality of times is continuously measured, the controller is configured to determine that the occupant is present in the vehicle.

6. The vehicle according to claim 1, further comprising:
   a communicator configured to communicate with a user terminal,
   wherein when it is determined that there is the occupant in the vehicle, the controller is configured to control the communicator to transmit a warning signal to the user terminal.

7. The vehicle according to claim 1, wherein when the intensity of the ultrasonic signal is higher than the changed preset level, the controller is configured to determine that the occupant is present in the vehicle.

8. The vehicle according to claim 1, wherein when the intensity of the ultrasonic signal is lower than the changed preset level, the controller is configured to determine that there is no the occupant in the vehicle.

9. The vehicle according to claim 1, wherein when starting of the vehicle is detected to be off, the controller is configured to control the second detector to detect the opening and closing state of the window.

10. A method of controlling a vehicle, comprising:
    transmitting and receiving an ultrasonic signal to detect a presence or absence of an occupant inside the vehicle based on the ultrasonic signal;
    detecting an opening and closing state of a window including at least one of an upper window or a side window provided in the vehicle; and
    changing a preset level based on the opening and closing state, and comparing an intensity of the ultrasonic signal with the changed preset level to determine the presence of the occupant.

11. The method according to claim 10, wherein:
    the detecting of the opening and closing state of the window comprises detecting the opening and closing state of the upper window or the side window;
    the opening and closing state comprises a first state in which both the upper window and the side window are not open, a second state in which the upper window or the side window is partially open, and a third state in which the upper window or the side window is fully open; and
    the determining of the presence of the occupant comprises determining the presence of the occupant based on a second level in the second state, determining the presence of the occupant based on a first level lower than the second level in the first state, and determining the presence of the occupant based on a third level higher than the second level.

12. The method according to claim 10, wherein the determining of the presence of the occupant comprises:
    determining the presence of the occupant based on the preset level corresponding to the opening and closing state based on a level table to which the preset level is assigned for each the opening and closing state.

13. The method according to claim 10, wherein the determining of the presence of the occupant comprises:
    measuring the intensity of the ultrasonic signal a plurality of times.

14. The method according to claim 13, wherein the determining of the presence of the occupant comprises:
  when the intensity of the ultrasonic signal higher than the preset level among the plurality of times is continuously measured, determining that the occupant is present in the vehicle.

15. The method according to claim 10, further comprising:
  when it is determined that there is the occupant in the vehicle, controlling to transmit a warning signal to the user terminal.

16. The method according to claim 10, wherein the determining of the presence of the occupant comprises:
  when the intensity of the ultrasonic signal is higher than the changed preset level, determining that the occupant is present in the vehicle.

17. The method according to claim 10, wherein the determining of the presence of the occupant comprises:
  when the intensity of the ultrasonic signal is lower than the changed preset level, determining that there is no the occupant in the vehicle.

18. The method according to claim 10, wherein the detecting of the opening and closing state of the window comprises:
  when starting of the vehicle is detected to be off, controlling to detect the opening and closing state of the window.

19. A non-transitory computer readable medium containing program instructions executed by a processor, the computer readable medium comprising:
  program instructions that transmit and receive an ultrasonic signal to detect a presence or absence of an occupant inside the vehicle based on the ultrasonic signal;
  program instructions that detect an opening and closing state of a window including at least one of an upper window or a side window provided in the vehicle; and
  program instructions that change a preset level based on the opening and closing state, and comparing an intensity of the ultrasonic signal with the changed preset level to determine the presence of the occupant.

* * * * *